Figure 1:
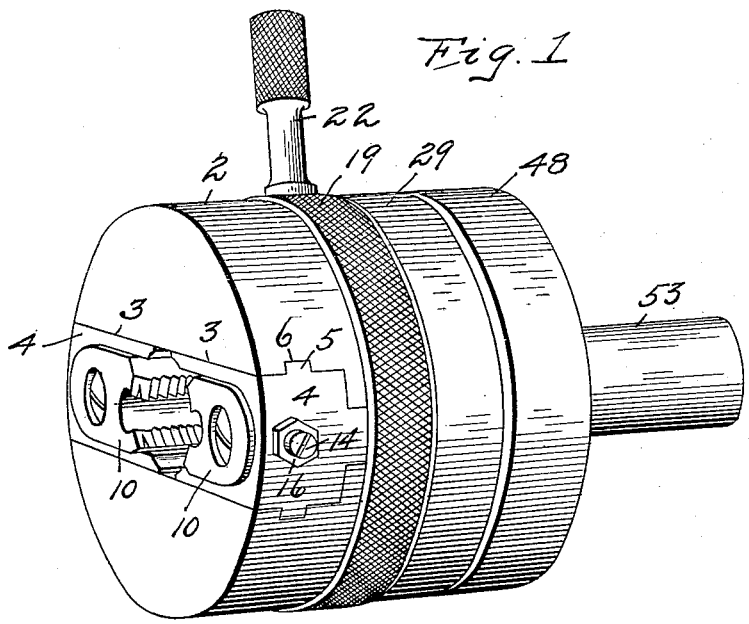

F. L. BROWN & I. W. SPRINK.
AUTOMATIC DIE HEAD.
APPLICATION FILED NOV. 26, 1907.

909,748.

Patented Jan. 12, 1909.
4 SHEETS—SHEET 1.

WITNESSES:
W. F. Foy
R. C. Braddock.

INVENTORS
Frederick L. Brown,
and Isaac W. Sprink
BY
S. T. Wolhaupter,
Attorney

F. L. BROWN & I. W. SPRINK.
AUTOMATIC DIE HEAD.
APPLICATION FILED NOV. 26, 1907.

909,748.

Patented Jan. 12, 1909.

4 SHEETS—SHEET 2.

WITNESSES
W F Foy
R. C. Braddock

INVENTORS
Frederick L. Brown,
and Isaac W. Sprink.
BY
D. P. Wolhaupter
Attorney

F. L. BROWN & I. W. SPRINK.
AUTOMATIC DIE HEAD.
APPLICATION FILED NOV. 26, 1907.
909,748.
Patented Jan. 12, 1909.
4 SHEETS—SHEET 3.
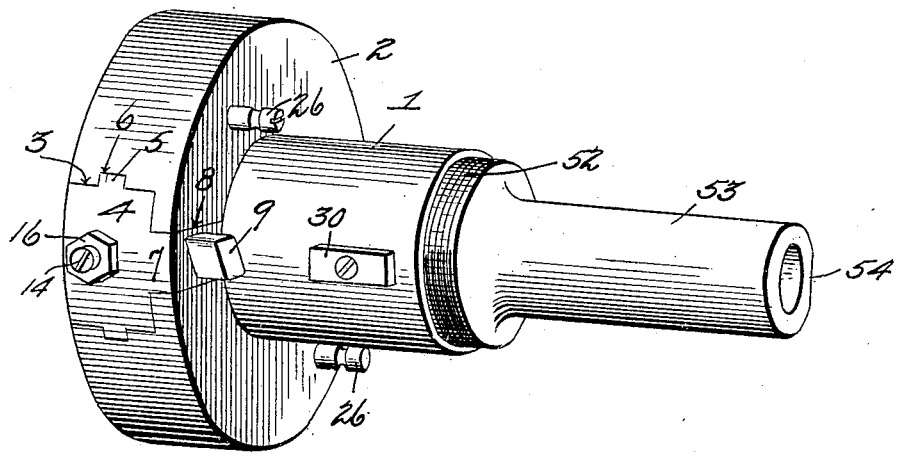
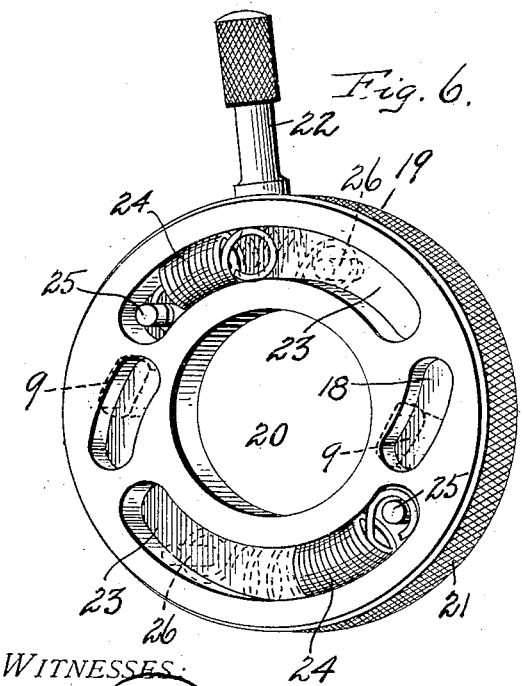
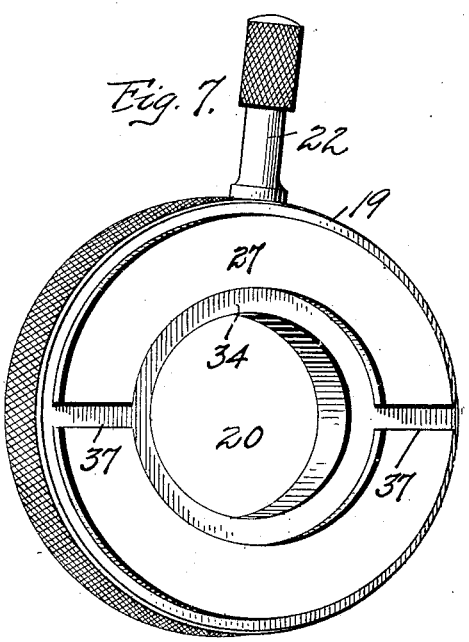
WITNESSES
INVENTORS
Frederick L. Brown,
and Isaac W. Sprink
BY
Attorney

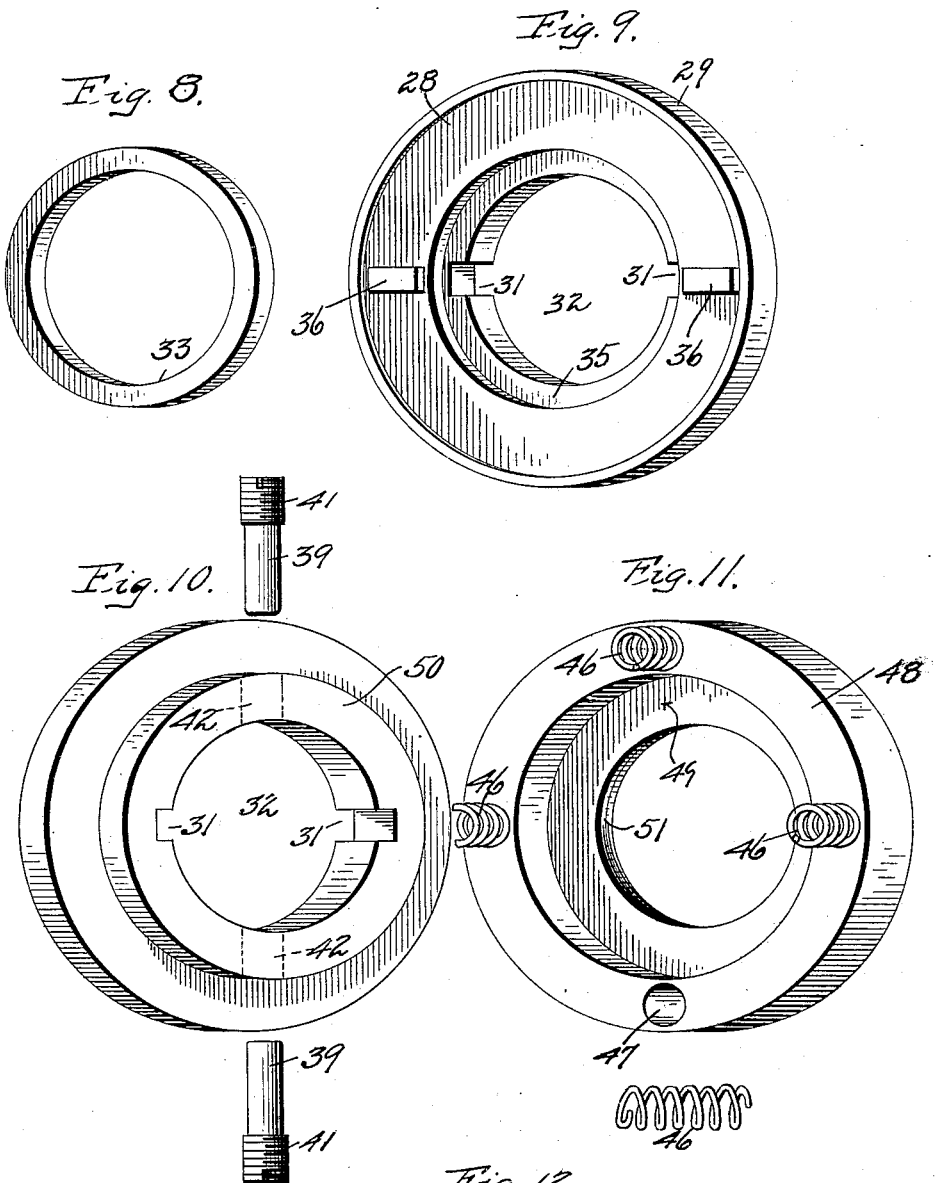

UNITED STATES PATENT OFFICE.

FREDERICK L. BROWN AND ISAAC WM. SPRINK, OF SCOTTDALE, PENNSYLVANIA, ASSIGNORS TO CRESCENT MANUFACTURING COMPANY, OF SCOTTDALE, PENNSYLVANIA, A CORPORATION OF PENNSYLVANIA.

AUTOMATIC DIE-HEAD.

No. 909,748.     Specification of Letters Patent.     Patented Jan. 12, 1909.

Application filed November 26, 1907. Serial No. 403,841.

*To all whom it may concern:*

Be it known that we, FREDERICK L. BROWN and ISAAC W. SPRINK, citizens of the United States, both residing at Scottdale, in the county of Westmoreland and State of Pennsylvania, have invented certain new and useful Improvements in Automatic Die-Heads, of which the following is a specification.

This invention relates to metal working tools, and has special reference to an improved automatic die head for screw cutting.

To this end the invention has in view the provision of a simple and thoroughly practical construction of die head adapted for use in the machine shop in connection with the usual machinery employed for screw cutting, and comprising positive and reliable means whereby the cutting or threading dies are automatically knocked off from the work, or released from their operative positions so that the cutting operation can be automatically arrested when a screw of any predetermined length has been cut.

A general object of the present invention is to provide a simple and substantial construction of automatic die head which is readily and conveniently handled and easily understood by the ordinary mechanic or operator, which is a feature of practical importance in machine shop practice.

Furthermore, the invention has in view the provision of a tool of this character which can be constructed and maintained at a minimum of expense, while at the same time comprising in its organization positive and reliable means for opening and closing the cutting members, and also insuring with certainty the automatic opening of the tool at the completion of the threading operation.

Another feature of importance in connection with the improved tool claimed herein is that of the provision of a strong and substantial locking device for the die adjusting cam ring, so as to insure a solidity and rigidity which is very essential in tools of this type.

Another object of the invention is to provide an automatic die head wherein the various members are compactly and securely mounted on the tool stock, while at the same time being readily assembled and disassembled.

With these and many other objects in view, which will more readily appear as the nature of the invention is better understood, the same consists in the novel construction, combination and arrangement of parts hereinafter more fully described, illustrated and claimed.

Figure 2:
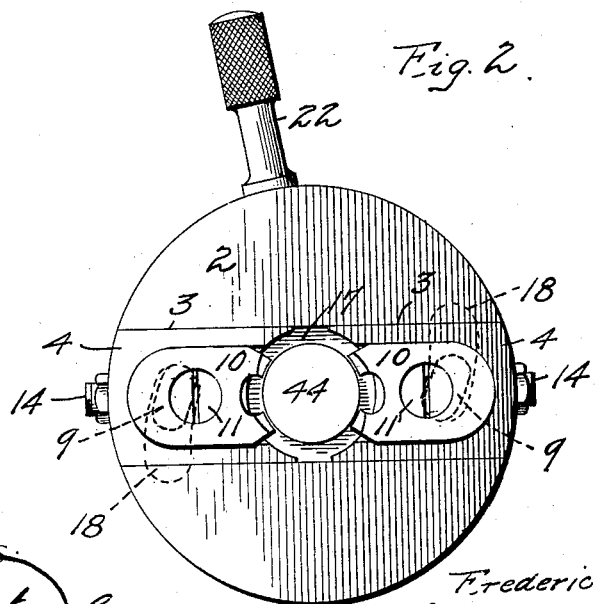
Figure 3:
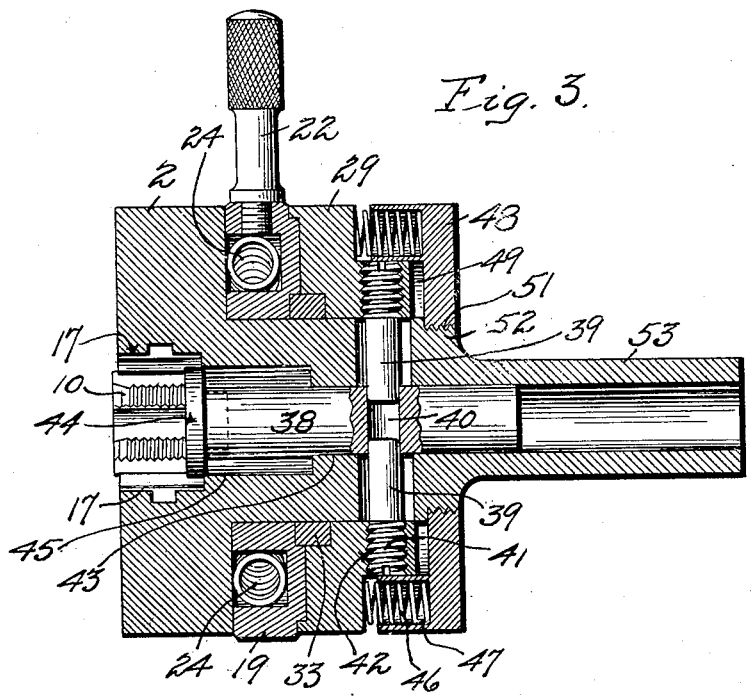
Figure 4:
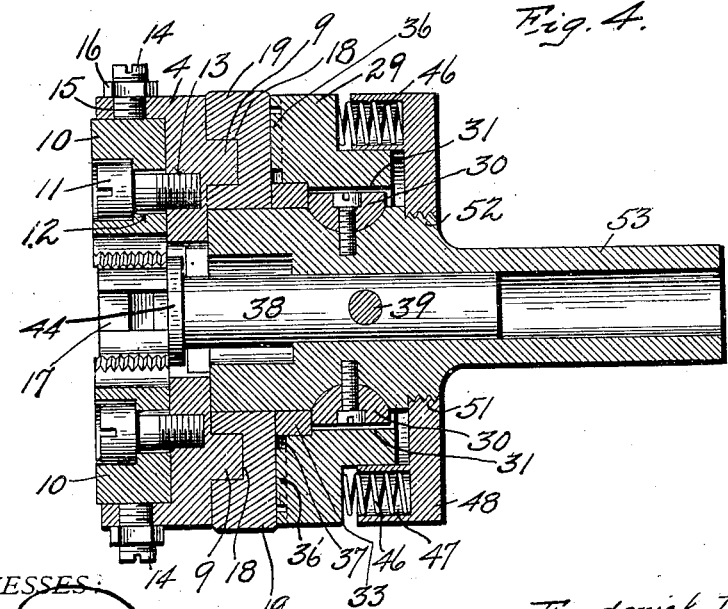

The essential features of the invention are necessarily susceptible to structural modification without departing from the scope thereof, but a preferred embodiment of the invention is shown in the accompanying drawings, wherein:

Figure 1 is a perspective view of an automatic die head constructed in accordance with the present invention. Fig. 2 is a front end view thereof; the view indicating, by dotted lines, the relation of the parts coöperating with the cam ring when the latter is set to hold the dies in their closed cutting positions. Fig. 3 is a longitudinal sectional view of the complete tool. Fig. 4 is a view similar to Fig. 3, with the line of section taken at right angles to the line of section on Fig. 3. Fig. 5 is a perspective view of the tool stock and head piece, with the cam ring, locking ring, and end abutment ring removed. Figs. 6 and 7 are perspective views, respectively, from opposite sides of the die adjusting cam ring. Figs. 8 and 9 are details in perspective of the spacing collar and locking ring. Fig. 10 is a rear perspective of the locking ring and showing the coupling pins therefor. Fig. 11 is a detail in perspective of the end abutment ring and the pressure springs carried thereby, one of said springs being shown removed. Fig. 12 is a detail in perspective of the release or knock-off plunger for the tool.

Like references designate corresponding parts in the several figures of the drawings.

The improved die includes in its general organization a main body portion 1 which may be characterized as a tool stock. This tool stock is of a tubular cylindrical formation and has formed rigidly therewith at one end the circular or other suitably shaped head piece 2, which may be an integral part of the tool stock as shown, or separably formed and rigidly connected thereto by any suitable means, but for the purposes of the present invention, it is simply to be understood that the head piece 2 is carried with the tool stock or body 1 as a rigid member or part thereof.

The head piece 2 of the tool stock has formed in the face thereof the transverse and radially arranged guide ways 3 slidably accommodating therein the similarly arranged die holders 4. These die holders 4 are disposed in opposing relation and are preferably provided at the side edges thereof with the guiding and retaining ribs 5 slidably interlocking with correspondingly shaped guiding and holding grooves 6 provided in the side walls of the guide ways 3, and in this connection it will be further observed that each of the radially shiftable or slidable die holders 4 is provided at what may be termed its inner side, with an inner guide member 7 in the form of a relatively wide rib fitting in the rear guide slot 8 formed in the inner or rear face of the head piece 2. Hence, the inner guide member 7 of each die holder 4 is exposed at the inner or rear side of the head piece and carries thereon a rigid obliquely set cam lug 9, the functions of which will be hereinafter more fully explained in connection with the shifting action for the die holders 4.

From the construction described, it will be seen that the die holders 4 are slidably interlocked within the head piece 2 and each of the same is in the form of an approximately rectangular boxing open at its outer side to detachably and adjustably receive therein a suitable cutting or threading die 10. Each cutting or threading die 10 neatly registers within the open socket of the die holder 4 therefor and is fastened to the latter through the medium of the fastening screw 11 countersunk in the body of the die and extending through the screw slot 12 therein, the threaded extremity of said fastening screw engaging a threaded socket 13 provided in the base of the die holder 4, as plainly shown in Fig. 4 of the drawings. Also, in this connection, it is to be noted that the screw slot 12 of each cutting die 10 is of slightly greater width than the diameter of the shank of the screw 11 so as to permit of a lengthwise adjustment of the die in its holder, which lengthwise adjustment may be nicely and accurately accomplished through the medium of a die adjusting screw 14 working in the threaded opening 15 in the outer end of the die holder and accommodating thereon a lock nut 16 which is tightened to lock the screw 14 to hold the same tight in its adjusted position.

The equipment for each die and die holder is the same as just described, and it will be understood that any desired number of dies and die holders may be employed according to the particular work for which the tool is designed, but in the ordinary construction of the tool for ordinary screw cutting purposes, it is usual, as shown in the drawings, to equip the tool with only a pair of cutting dies and die holders arranged in opposing relation respectively at opposite sides of the center working space or opening 17 in the head piece 2.

The obliquely set cam lugs 9 of the oppositely arranged die holders are adapted to respectively engage in the oppositely located inclined cam grooves or slots 18 provided in one face of a cam ring 19 respectively at diametrically opposite sides of the center opening 20 through such ring, so that by the rotation of the latter on the tool stock 1 the lugs 9 will be necessarily carried inward or outward according to the direction of rotation of the ring, with the result of radially shifting the dies with the die holders.

The cam ring 19 loosely embraces the tool stock 1 alongside of the head piece 2 and is provided with a milled external gripping surface 21 which may be used if desired for manipulating the ring, although it is preferable to equip the latter at a suitable point with an offstanding operator's or setting handle 22. Aside from these details, the cam ring 19 is provided in the face thereof next to the head piece 2 with a pair of diametrically opposite segmental spring recesses 23 accommodating and housing therein the strong coiled die-opening springs 24. One end of each of said springs is connected to the spring holding pin 25 carried by the cam ring at one end of the recess for said spring, while the other end thereof is connected, as indicated by the dotted lines in Fig. 6, to a fixed spring holding pin 26 carried by and projecting from the inner side of the head piece 2 of the tool stock, there being one of the fixed holding pins 26 for each of the opposite die opening springs 24, as will be apparent.

The rotatable cam ring 19 is provided at its side opposite its cam grooves 18 and opening springs 24, with an annular bearing shoulder 27 having a registering engagement with a correspondingly channeled seat 28 formed in one side of a longitudinally shiftable and non-rotative locking ring 29 also mounted on the tool stock. This locking ring 29 preferably has a suitable feathered connection with the tool stock 1 so as to be capable of a longitudinal sliding movement thereon without having an independent rotation. This connection may be effected through any of the usual expedients employed for such purposes, though preferably by means of a pair of feathering keys 30 screwed or otherwise suitably fastened to opposite sides of the tool stock 1 and interlocking with the key notches 31 formed in opposite edges of the center opening 32 of the ring 29.

To provide for the proper spacing and mounting of the parts, it is also preferable to arrange on the stock 1 between the two rings 19 and 29, the spacing collar or ring 33 registering in the opposing rabbeted collar seats 34 and 35 of the rings 19 and 29 respectively. The latter of said rings is also provided at the channeled side thereof with a pair of diametrically opposite offstanding lock studs 36, which are set solidly in the ring so as to form a rigid and immovable part thereof, and these lock studs are adapted to be moved in and out of engagement with correspondingly positioned keeper notches 37 provided in one side of the cam ring 19.

The locking ring 29 is adapted to be coupled to a longitudinally movable release or knock-off plunger 38 through the medium of diametrically opposite coupling pins 39 whose inner ends loosely engage in a pin opening 40 in the plunger 38 and whose outer ends are provided with threaded openings 41 for detachable mounting in the threaded openings 42 provided in the body portion of the ring 29, as may be plainly seen from Figs. 3 and 10 of the drawings.

The plunger 38 is slidably mounted in the center bore 43 of the tool stock, and provided at its outer end with a strike head 44 exposed within the center working space 17 of the head piece and has a movement into the clearance socket 45 which is continued back into the tool stock from said space 17, as clearly illustrated in Fig. 3.

The ring 29 is normally and yieldingly held against the cam ring 19 by means of a series of coiled pressure springs 46 arranged equidistant apart and seated at one end in the spring holding sockets 47 provided in the inner side of an end abutment ring 48. The other ends of said springs 46 have a flat bearing against one side of the locking ring 29 and hold the same by a firm and even pressure against the cam ring, while at the same time permitting of sufficient play for the locking ring so that it may be readily disengaged from the cam ring through the action of the work.

The end abutment ring 48 is recessed at one side, as at 49, to form a guiding pocket for the continuous collar portion 50 of the ring 29, in which collar portion the pins 39 are mounted, and to provide for the proper and detachable mounting of the end abutment ring on the tool stock, the said ring is preferably provided with a center threaded opening 51 engaging a threaded shoulder portion 52 formed on the tool stock 1. Beyond the threaded shoulder portion 52 the tool stock is provided with the usual tubular stem 53 having a flattened side portion 54 to afford means for mounting the die head on the machine in connection with which it may be employed.

In the use of the tool, it will be apparent that after proper adjustment of the cutting dies 10, the same may be closed and locked in their operative cutting positions by turning the cam ring 19 against the pull or tension of the springs 24, thus placing said springs under active stretch or tension and bringing the notches 37 into position where the lock studs 36 are snapped into engagement therewith through the pressure of the springs 46. When the desired length of screw has been cut, the cutting operation becomes automatically arrested by the work coming in contact with the head of the plunger 38. This contact causes the plunger to be moved backward with the result of sliding the locking ring backward from, and out of engagement with, the cam ring, whereupon the springs 24 are free to act and rotate the cam ring in a direction for shifting the die holders and dies carried thereby in an outward direction, thereby opening the dies from the work.

From the foregoing, it is thought that the construction, operation, and many advantages of the herein described automatic die head will be apparent without further description, and it will be understood that changes in the form, proportion, and minor details of construction may be resorted to without departing from the spirit or sacrificing any of the advantages of the invention.

We claim:

1. An automatic die head comprising a tool stock carrying shiftable dies, a spring actuated rotatable cam ring operatively connected with said dies and provided in one side with a pair of diametrically opposite keeper notches, a locking ring having a feathered connection directly on the tool stock and provided upon one side thereof with a pair of diametrically opposite rigid lock studs engaging said notches of the cam ring, a longitudinally movable release plunger slidably mounted within the tool stock and having a pin opening therein, coupling pins detachably connected with the locking ring and having their inner ends engaging in said pin opening of the plunger, and a plurality of pressure springs supported to bear against one side of the locking ring.

2. An automatic die head comprising a tool stock carrying shiftable dies, a spring actuated rotatable cam ring, a locking ring coöperating with the cam ring, a release device connected with the locking ring, an end abutment ring detachably mounted on the stock and provided with a socketed portion overhanging a part of the lock ring, and pressure springs between the socketed portion of the abutment ring and one side of the locking ring.

In testimony whereof we hereunto affix our signatures in the presence of two witnesses.

FREDERICK L. BROWN.
ISAAC WM. SPRINK.

Witnesses:
E. F. DOORLEY,
KATHRYN PHELAN.